United States Patent [19]
Morey

[11] 3,828,473
[45] Aug. 13, 1974

[54] METHOD, CONTAINER AND TOOL FOR GROWING AND PLANTING GRAPES AND OTHER DEEP AND/OR TAP ROOTED PLANTS

[76] Inventor: Dennison H. Morey, 555 Irwin Ln., Santa Rosa, Calif. 95401

[22] Filed: Jan. 8, 1973

[21] Appl. No.: 321,573

[52] U.S. Cl. ............................ 47/58, 47/30, 47/37, 111/4, 229/41 C, 229/93, 138/119, 138/172
[51] Int. Cl. ............................ A01c 5/02, A01g 9/02
[58] Field of Search ............ 47/37, 34.13; 229/4.5, 229/41 R, 23 A, 93, 41 C; 138/118-119, 121, 172; 111/4

[56] References Cited
UNITED STATES PATENTS

| | | | |
|---|---|---|---|
| 404,585 | 6/1889 | Wright | 47/37 |
| 522,039 | 6/1894 | Baldridge | 47/37 |
| 1,940,657 | 12/1933 | Woodford | 138/172 |
| 3,164,507 | 1/1965 | Masuda | 47/37 X |
| 3,343,567 | 9/1967 | Mulligan et al. | 138/119 |
| 3,375,607 | 4/1968 | Melvold | 47/37 |
| 3,425,764 | 2/1969 | Budd | 229/41 C |
| 3,508,587 | 4/1970 | Mauch | 138/119 |

Primary Examiner—Robert E. Bagwill
Attorney, Agent, or Firm—James R. Cypher

[57] ABSTRACT

A method for growing deep and/or tap rooted plants such as grapes and many shade trees in a growing container which is foldable, longitudinally ribbed or grooved and open at both ends. After the plant is ready for replanting in cultivated soil a special C-shaped tool pushes the plant along with the growing medium intact through the bottom of the container into a prepared hole. The container is left partially buried in the ground and the elevated portion serves to shade the graft union and protect it from certain worms, insects, rodents and mechanical damage.

8 Claims, 12 Drawing Figures

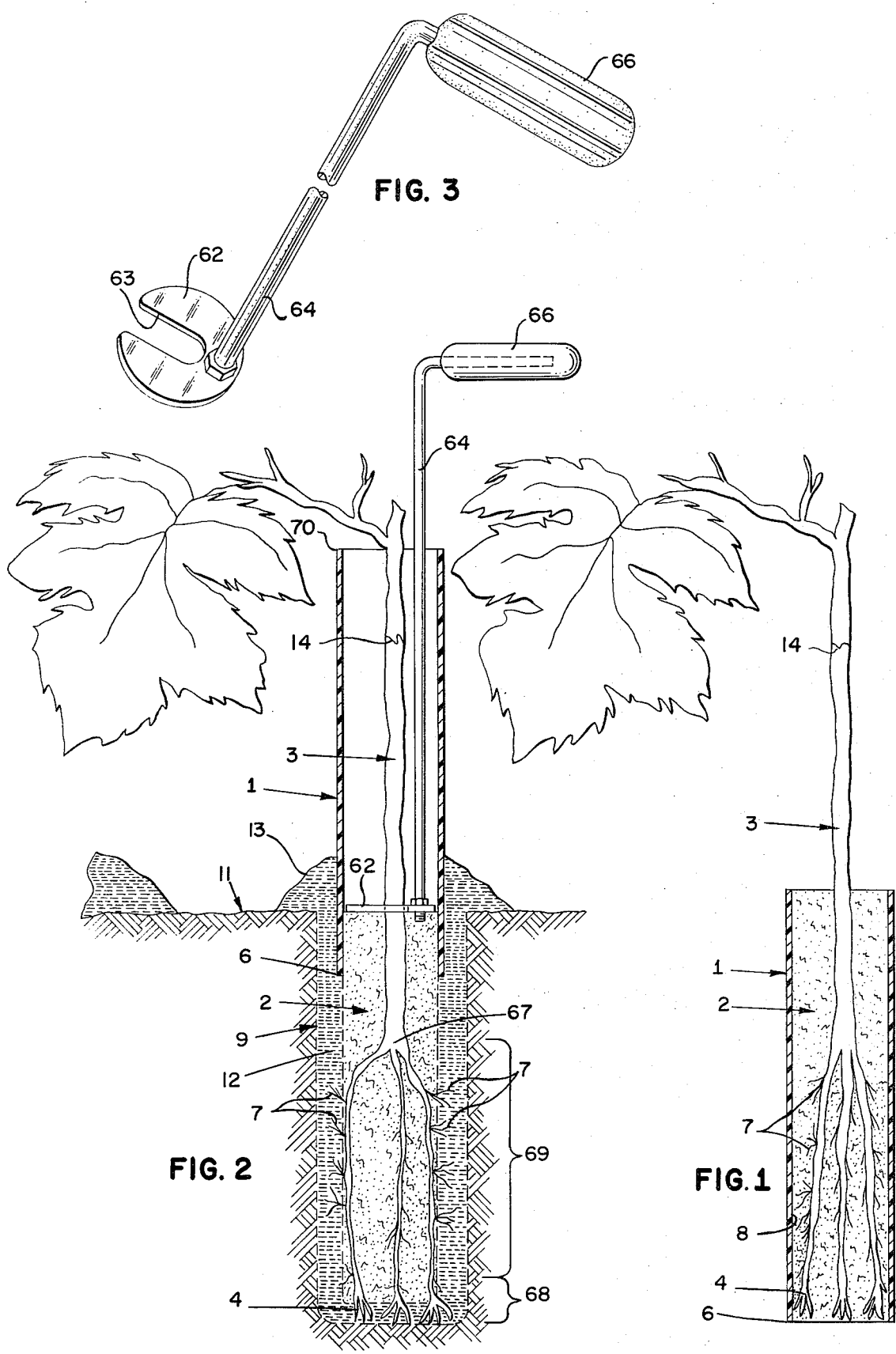

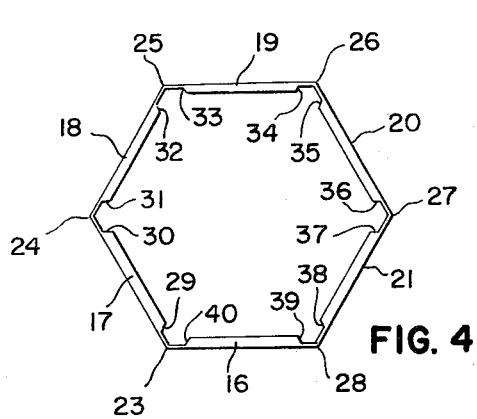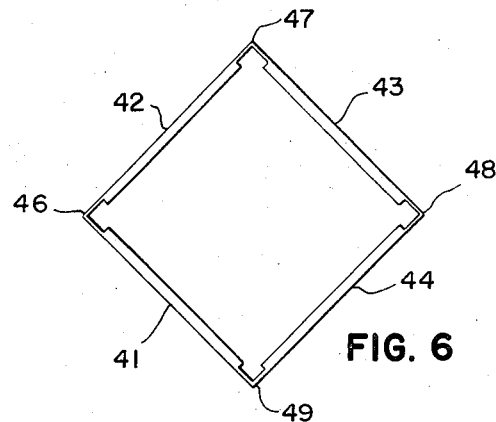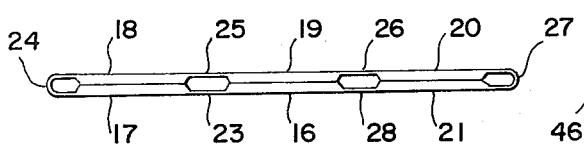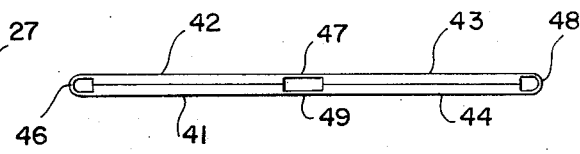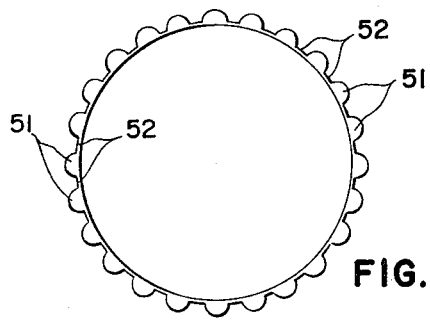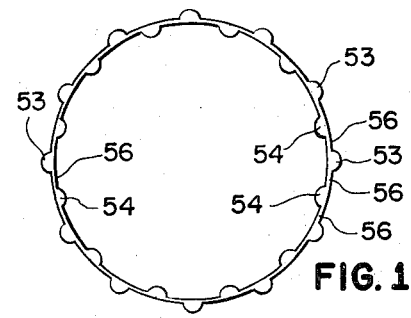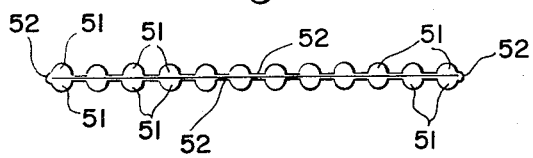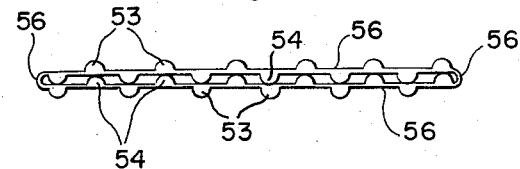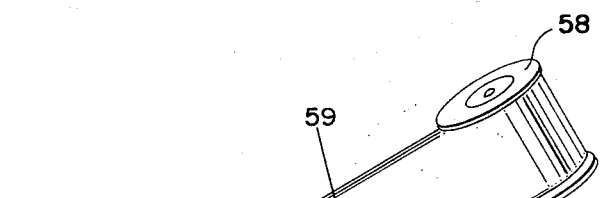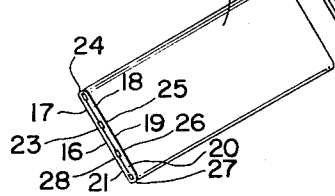

3,828,473

METHOD, CONTAINER AND TOOL FOR GROWING AND PLANTING GRAPES AND OTHER DEEP AND/OR TAP ROOTED PLANTS

BACKGROUND OF THE INVENTION

Young and newly grafted plants are grown in controlled conditions until they are mature enough to be planted in the cultivated fields. It has been the practice of some to grow the plants in relatively shallow plastic pots and then to remove the pot upon planting. This practice produces many failures because the plants cannot take the shock of losening the soil from around the roots during transplanting.

Others have tried growing the plants in plastic or wax coated cardboard or paper tubes or pots which may be open at both ends. The container is planted and growth is dependent upon the roots growing out the base. The problem with this container is that it does not disintegrate fast enough and few or none of the roots can reach moisture or the nutrition in the soil.

SUMMARY OF THE PRESENT INVENTION

The gist of the present invention is the use of a special container which serves to contain the new plant in its special growing medium unitl the plant is mature enough to be transplanted and which is then partially removed by sliding upwardly so that there is a minimum of disturbance between the roots and growing medium. The partially removed container then serves to protect the graft union from direct sun and from various ground worms, insects, vermin, mechanical damage and other environmental hazards.

It is an object of the present invention to get the lateral roots as well as the bottom roots of the plant in direct contact immediately with the native soil and to the greatest possible depth. Since water sometimes will not move between soils of different densities and weights it is essential that all of the roots of the plant be free to grow into the native soil immediately so that as many as possible will reach the water and nutrients in the native soil. The nutrients are generally found in the top 8 inches of soil and it is essential that the lateral roots of the plant be permitted to immediately reach these nutrients.

Ideally, a growing container for deep and/or tap rooted plants such as grapes and many shade trees, especially those such as Pistachio spp., must allow for an unusually deep root development before the top or water roots are severed or stopped and lateral root development is encouraged. Moreover, particularly with grapes, the container must be deep enough to place the terminal, exploratory root tips 8 or 10 inches below ground level where sufficient water reserves exist under ordinary field conditions to permit normal vineyard cultural practices to be used after planting. The ideal container must also enable the greatest possible amount of planting medium to be used per unit bench space growing area. It must also be of such design that minimal shipping space and storage area be required for transport and inventory purposes. To this end the containers should be either flat when stored or tapered so as to nest. Since tapered containers do not optimally utilize bench area in relation to the amount of growing medium which they contain the ideal container would be one which has parallel axial wall surfaces and which is so designed as to be flat when stored. Ideally, growing containers, especially for grapes, should be of such a design as will facilitate mechanical planting and machine handling. Finally, especially for grapes but not limited to grapes, the ideal container should be of such design and construction as will allow the container to serve as a sunshield and rodent guard after planting. The present invention achieves all of these objectives in a manner and to a degree heretofore unknown.

BRIEF DESCRIPTION OF THE DRAWINGS

FIG. 1 is a side elevation view with the container in cross section and part of the growing medium stripped away to show the relationship of the plant and the container immediately prior to transplanting.

FIG. 2 is a side elevation view with the container in cross section and the hole and native soil in cross section with the container in the final position in relation to the plant immediately after transplanting. The tool of the present invention is shown in its final position just prior to being withdrawn from the container.

FIG. 3 is a perspective view of the tool shown in FIG. 2.

FIG. 4 is an end view of the preferred form of the container shown in FIGS. 1 and 2.

FIG. 5 is an end view of the container of FIG. 4 in the folded position.

FIG. 6 is an end view of another form of the container of the present invention.

FIG. 7 is an end view of the container of FIG. 6 in the folded position.

FIG. 8 is an end view of still another form of the container of the present invention.

FIG. 9 is an end view of the container of FIG. 8 in the folded position.

FIG. 10 is an end view of another form of the container of the present invention.

FIG. 11 is an end view of the container of FIG. 10 in the folded position.

FIG. 12 is a perspective view of the container shown in FIGS. 4 and 5 stored on a spool. The forms of the invention shown in FIGS. 6 – 11 may also be stored on a spool in the same manner.

BRIEF DESCRIPTION OF THE PREFERRED FORMS OF THE INVENTION

The method for growing and planting deep and/or tap rooted plants such as grapes and many shade trees comprises the following steps: (a) filling a continuous walled, open ended container 1 with a growing medium 2, (b) inserting a young plant 3 into the growing medium, (c) placing the container in close fitting relation to other containers on a surface providing a root barrier, (d) providing the necessary water, nutrients and climate until the plants have attained the necessary maturity for planting wherein the tap root 4 has reached a position adjacent the bottom 6 of the container and small lateral root growth 7 has reached or is near the side walls 8 of the container, (e) providing a hole 9 in the cultivated area 11 approximately equal to the height of the container and slightly larger than the area of the container, (f) inserting the plant and container into the prepared hole, (g) forcing the plant 3 and growing medium intact downwardly and out the bottom 6 of the container while raising the container until the container is within a short distance of the top of the growing medium as shown in FIG. 2, and (h) stabilizing the plant and container by filling the hole with soil 12 and placing a small mound of soil 13 about the base of the container. The container shades and covers the graft union 14 of the plant and the bottom of the container remains buried in the soil and forms a barrier around the base of the plant.

The essential characteristics of the container used in the present method are as follows: (a) container is formed with elongated continuous side walls and is open at both ends, (b) the walls are constructed with longitudinally running ribs providing axial free standing rigidity and lateral folding; the ribs consist of alternating relatively thick and thin walls, (c) the container is formed from a flexible material which can be folded at its thin portions, is impervious to root penetration and is water stable; and (d) the inner wall surface of the container has a slippery finish to provide ease in removing the growing medium and plant from the container with a minimum disturbance between the plant and growing medium.

The preferred container shape is shown in FIG. 4. This container has six sides 16, 17, 18, 19, 20 and 21. These side portions are joined at their ends by relatively thinner corner members 23, 24, 25, 26, 27, and 28. While the thickened side portions provide free standing stability, the thin corner portions permit the container to be folded at the corner portions as shown in FIG. 5. The container folds flat by hinging at corners 24 and 27 with side 18 folding flat against side 18, side 16 against side 19 and side 21 against side 20. The thin corners 23 – 28 may be about 10 mils thick while the sides 16 – 21 may be about 35 – 50 mils thick. Foldability is enhanced by chamfering the inside edges as at 29 – 40. It may be understood that instead of the sides 16 – 21 being turned inward and forming a serrated surface on the inside of the container, the sides 16 – 21 may face outward forming a smooth inside walled surface and a serrated surface on the outside of the container.

Another shaped container is shown in FIGS. 6 and 7. Here, the container is the shape of a square with relatively thick sides 41, 42, 43, and 44, joined by relatively thin corner portions 46, 47, 48 and 49. As shown in FIG. 5, the fold can be made at corners 46 and 48 with side 42 folding on side 41 and side 43 folding on side 44.

Still another form of the invention is shown in FIGS. 8 and 9. In this form of the invention, the container side wall is generally cylindrical and is formed by alternating hemispherical shaped ribs 51 joined by slightly arcuate thin sections 52. This shape provides a smooth inner wall and a serrated outer wall. FIG. 9 shows the manner in which the container is folded flat with the hemispherical ribs 51 generally folding upon one another and the container hinging at the thin portions 52.

Another form of the invention is shown in FIGS. 10 and 11. In this form, hemispherical portions 53 facing outwardly alternate with hemispherical portions 54 facing inwardly. The hemispherical portions are joined by relatively thin portions 56. The container of FIG. 10 may be folded flat as shown in FIG. 11 by bending at the thin portions 56.

An essential feature of the present invention is the ability of the container to be rolled upon a spool or reel 58 as shown in FIG. 12. The container is extruded, flattened and then a single long strip 59 is wound upon the spool. Lengths 60 are cut off as needed. The container material must be flexible in the longitudinal direction so that it can be wound upon the spool.

FIG. 3 illustrates a special tool which is used to partially remove the container from the plant and growing medium. FIG. 2 shows the tool in relation to the plant and container just prior to removal of the tool.

The tool consists briefly of a plate 62 dimensioned for insertion into and for sliding longitudinally through the container. The plate has an area somewhat smaller than the cross sectional area of the container so that the growing medium will be almost entirely removed from the container and the plant and growing medium will stay intact. The object is to effect as little disturbance of the growing medium and root system as possible.

The plate is formed with an open ended radial slot 63 which is adapted for receiving the trunk of the plant. An elongated member 64 is connected to the plate at an approximately right angle and has a length adapted for insertion completely through the container as shown in FIG. 2. Note that in the planting operation, the plate is within about 1 to 1½ inches of the bottom of the container. A manually graspable handle 66 is connected to the top of the elongated member.

Basically my invention is a cylindrical or polygonal container designed to use and constructed of materials which enable it to be flattened or partially flattened and then returned to its original and desired shape by manipulation and/or filling with growing medium. Suitable materials would be paper, preferably impregnated with waxes of flexible plastic to enhance its strength, water stability and folding properties, plastics such as polystyrene, polyethylene, polypropylene, polybutene, polyvinylchloride, mixtures of the above, fluoroplastics such as teflon and other plastics and materials with similar physical properties.

This invention primarily and particularly utilizes the common flexible plastics such as polyethylene, polyvinylchloride, and polypropylene. The necessary degree of vertical rigidity and stiffness, while still permitting folding for transport and storage, is achieved by various forms of axial ridging with sufficiently thin inter-rib spaces to allow folding and hingeing of the sides but still of sufficient thickness to provide the tensile strength required to maintain the integrity of the container during its desired life-span. A narrowly ribbed tube, FIGS. 8 – 10, ribbed either inside or out or both, cut to appropriate desired lengths are possible configurations but are not the most desired one because the shape would vary on use and optimum space utilization would not be possible. A square or rectangle, FIG. 6 of the convenient cross sectional dimensions with thin corners would be a preferred form, but the sides would have to be relatively thick to prevent distortion in use. Thinner walls and a more economical use of material while still retaining a fixed shape and an essentially round form which would be an aid to both planting in punched or augered holes and in mechanical handling is achieved with an hexagonal shape. The preferred and ideal configuration is shown in FIGS. 4 and 5.

The practice of the invention involves first of all the extrusion or forming of containers, with or without bottoms, of the desired diameter and length as is appropriate to the plant material being grown and the shapes and sizes of the flats, pallets, benches and machinery employed in the propagation, production, growing and planting of the plants. These containers are then filled with the desired planting medium, planted to the desired plants, and aggregated in whatever manner is desired, on pallets or benches, etc., but in such a way as to provide a bottom barrier or floor for the tubular container, and cared for in the normal and appropriate manner. A typical container for grapes would be an hexagonal cylinder 10–11 inches long and with each face being about 1.25 inches wide. Angle to angle the distance across is about 2.5 inches and wall to wall about 1.25 inches. The finished plant material is then planted in the desired site by digging, punching or augering a hole of the desired depth and size, removing the plant from the container, placing the soil-root mass in the hole, firming and settling in place in an appropriate manner and irrigating as required. More particularly, especially with grapes, the soil-root mass is only partially removed from the container by pushing the soil-root mass out the open bottom of the container or by pulling the container upward (or by a combination of both) leaving a small portion of the container around the top 1 – 1½ inches of the soil-root mass. The plant with its elevated container is then planted so that the bottom 1 – 1½ inch of the container still around the soil-root mass is below ground level, as shown in FIG. 2, and thereby securely stabilized. In this position the container serves as a sunshield and rodent guard and when formed of appropriate plastic or other slippery material will also protect the plants from certain insect pests and their larvae, e.g., wooly bear caterpillars, cut worms, army worms, etc. A necessary and included part of this invention is a tool or mechanical device to enable rapid and precise and mechanical ejection of the soil-root mass from the container in a downward direction. This can be readily achieved with a C- or U-shaped off set shanked tool as is shown in FIG. 3. In the preferred method the containered plant is held manually or mechanically and inserted in the planting hole to the depth that is desired to embed the container. The soil-root mass is then pushed downward out the bottom of the container into the prepared hole of proper depth and the planting procedure completed in an appropriate way to assure the establishment of the plant.

I have found in practicing the invention that the hole in the cultivated field should be about 3½ inches in diameter and about 9½ inches deep. When the plant is inserted into the hole, the crown 67 of the plant should be about 3 inches below the surface so that it is well above winter water table. The active water root zone for the first 10 days in zone 68 and the feeder root zone is indicated generally by 69.

When the container is withdrawn, the top 70 of the container should be approximately 8½ inches above the ground level. As shown in FIG. 2, the small lateral root hairs 7 can immediately move laterally outward from the growing medium and enter the native soil where they can begin to nourish the plant with water and nutrients.

I claim:

1. A method for growing and planting deep and/or taprooted plants such as grapes and many shade trees comprising:
   a. filling a continuous walled, open ended container with no bottom wall having parallel sides and a length to diameter ratio of about 4 to 1 with a growing medium;
   b. inserting a young plant into said growing medium;
   c. placing said container in close fitting relation on a surface providing a root barrier;
   d. providing the necessary water, nutrients and climate until said plant has attained the necessary maturity for planting wherein the taproot has reached a position adjacent or above the bottom of said container, small lateral root growth has reached the side walls of said container and the taproot has not circled the container horizontally;
   e. providing a hole in the cultivated area approximately equal to the height of said container and slightly larger than the area of said container;
   f. inserting said plant and container into said prepared hole;
   g. forcing the plant and growing medium intact downwardly and out the bottom of the container while raising the container until the container is within a short distance of the top of the growing medium; and
   h. stabilizing the plant and container so that the container shades and covers a major portion of the above ground portion of the plant and the bottom of the container remains buried in the soil and forms a barrier around the base of the plant.

2. A method for growing grape and other deep and/or taprooted plants during two stages of growth as described in claim 1 wherein:
   a. said container is formed with elongated continuous parallel side walls having a length to diameter ratio of about 4 to 1 and being open at both ends;
   b. said walls are constructed with longitudinally running ribs providing axial free standing rigidity and lateral folding, said ribs consisting of alternating relatively thick and thin walls;
   c. said container is formed from a flexible material which can be folded at its thin portions, is impervious to root penetration, and is water stable;
   d. the inner wall surface of said container has a slippery finish to provide ease in partially removing the growing medium and plant from said container with a minimum disturbance between the plant and growing medium;
   e. said container has sufficient rigidity to free stand after a substantial portion of said soil has beeen moved through the bottom of said container and a small portion of said container is implanted in the ground after transplanting; and
   f. said portion of said container above the ground protects the plant above the ground.

3. A method for growing grape and other deep and/or taprooted plants as described in claim 2 wherein:
   a. said container is a right circular cylinder.

4. A method as described in claim 2 wherein:
   a. said container is formed from one or a combination of the following materials: wax or plastic impregnated paper, polystyrene, polyethylene, polypropylene, polybutene, polyvinylchloride, teflon.

5. A method as described in claim 2 wherein:
   a. said container has a rectangular shape with the side portions being thickened in cross section and the corners being relatively thin permitting folding.

6. A method as described in claim 2 wherein:
   a. said container has a polygonal shape witn an even number of sides with the side portions being thickened in cross section and the corners being relatively thin permitting folding.

7. A method as described in claim 2 wherein:

a. said container has six sides of relatively thickened cross section and being joined at each side by relatively narrow thin wall sections permitting folding.

8. A method as described in claim 2 wherein:
a. said container ribs are formed providing a smooth continuous wall interior and a ribbed outer wall; and
b. said container is flexible so as to be rolled upon a spool about a horizontal axis.

* * * * *